US008024800B2

(12) United States Patent
Bednar et al.

(10) Patent No.: US 8,024,800 B2
(45) Date of Patent: Sep. 20, 2011

(54) FILE ATTACHMENT PROCESSING METHOD AND SYSTEM

(75) Inventors: Richard Gregory Bednar, Johnson City, NY (US); Jing-Tan T. Chen, Binghamton, NY (US); Baraa Kahf, Davis, CA (US); Gautam Majumdar, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1144 days.

(21) Appl. No.: 11/534,700

(22) Filed: Sep. 25, 2006

(65) Prior Publication Data

US 2008/0077990 A1   Mar. 27, 2008

(51) Int. Cl.
*G06F 11/00* (2006.01)
(52) U.S. Cl. ............................... 726/22; 726/23; 726/24
(58) Field of Classification Search .............. 726/22–25; 713/187–188
See application file for complete search history.

(56) References Cited

U.S. PATENT DOCUMENTS

| 7,039,857 | B2 | 5/2006 | Beck et al. |
| 7,089,267 | B2 | 8/2006 | Kageyama et al. |
| 7,092,948 | B1 | 8/2006 | Alford et al. |
| 7,092,993 | B2 | 8/2006 | Goldberg |
| 7,093,293 | B1 | 8/2006 | Smithson et al. |
| 2004/0267595 | A1* | 12/2004 | Woodings et al. ................. 705/9 |
| 2006/0130144 | A1 | 6/2006 | Wernicke |
| 2006/0167983 | A1 | 7/2006 | Webb |
| 2007/0016613 | A1* | 1/2007 | Foresti et al. ............... 707/104.1 |
| 2009/0138972 | A1* | 5/2009 | Scales ............................ 726/24 |

\* cited by examiner

*Primary Examiner* — Edward Zee
*Assistant Examiner* — Chi Nguy
(74) *Attorney, Agent, or Firm* — Schmeiser, Olsen & Watts; William E. Schiesser

(57) ABSTRACT

A file attachment processing method and system. The method comprises generating by a first computing system, a configurable list comprising valid computer file types for computer files. The valid computer file types for the computer files comprising a low risk for comprising computer viruses. The first computing system comprises a memory device. The first computing system stores the configurable list in the memory device. The first computing system receives a computer file comprising a first file type. The first computing system compares the first file type to the list to determine if the first file type comprises a valid file type from the first list.

40 Claims, 5 Drawing Sheets

FILE ATTACHMENT PROCESSING METHOD AND SYSTEM

FIELD OF INVENTION

The present invention relates to a method and associated system for transferring and processing computer file attachments.

BACKGROUND OF THE INVENTION

Transferring documents in a computing environment typically comprises an inefficient process. Accordingly, there exists a need in the art to overcome the deficiencies and limitations described herein above.

SUMMARY OF THE INVENTION

The present invention provides a method comprising:
generating, by a first computing system, a configurable list comprising valid computer file types for computer files, said valid computer file types for said computer files comprising a low risk for comprising computer viruses, said first computing system comprising a memory device;
storing, by said first computing system, said configurable list in said memory device;
receiving, from a first user by said first computing system, a computer file comprising a first file type; and
comparing, by said first computing system, said first file type with said list to determine if said first file type comprises a valid file type of said first list.

The present invention provides a computing system comprising a processor coupled to a computer-readable memory unit, said memory unit comprising instructions that when executed by the processor implement a file attachment processing method, said method comprising:
generating, by said computing system, a configurable list comprising valid computer file types for computer files, said valid computer file types for said computer files comprising a low risk for comprising computer viruses;
storing, by said computing system, said configurable list in said memory unit;
receiving, from a first user by said computing system, a computer file comprising a first file type; and
comparing, by said computing system, said first file type with said list to determine if said first file type comprises a valid file type of said first list.

The present invention provides a computer program product, comprising a computer usable medium comprising a computer readable program code embodied therein, said computer readable program code adapted to implement a file attachment processing method within a first computing system, said method comprising:
generating, by said first computing system, a configurable list comprising valid computer file types for computer files, said valid computer file types for said computer files comprising a low risk for comprising computer viruses, said first computing system comprising a memory device;
storing, by said first computing system, said configurable list in said memory device;
receiving, from a first user by said first computing system, a computer file comprising a first file type; and
comparing, by said first computing system, said first file type with said list to determine if said first file type comprises a valid file type of said first list.

The present invention provides a process for integrating computing infrastructure, comprising integrating computer-readable code into a first computing system, wherein the code in combination with the first computing system is capable of performing a file attachment processing method comprising:
generating, by said first computing system, a configurable list comprising valid computer file types for computer files, said valid computer file types for said computer files comprising a low risk for comprising computer viruses, said first computing system comprising a memory device;
storing, by said first computing system, said configurable list in said memory device;
receiving, from a first user by said first computing system, a computer file comprising a first file type; and
comparing, by said first computing system, said first file type with said list to determine if said first file type comprises a valid file type of said first list.

The present invention advantageously provides a simple method and associated system capable of transferring documents in a computing environment.

DETAILED DESCRIPTION OF THE INVENTION

Figure 1:
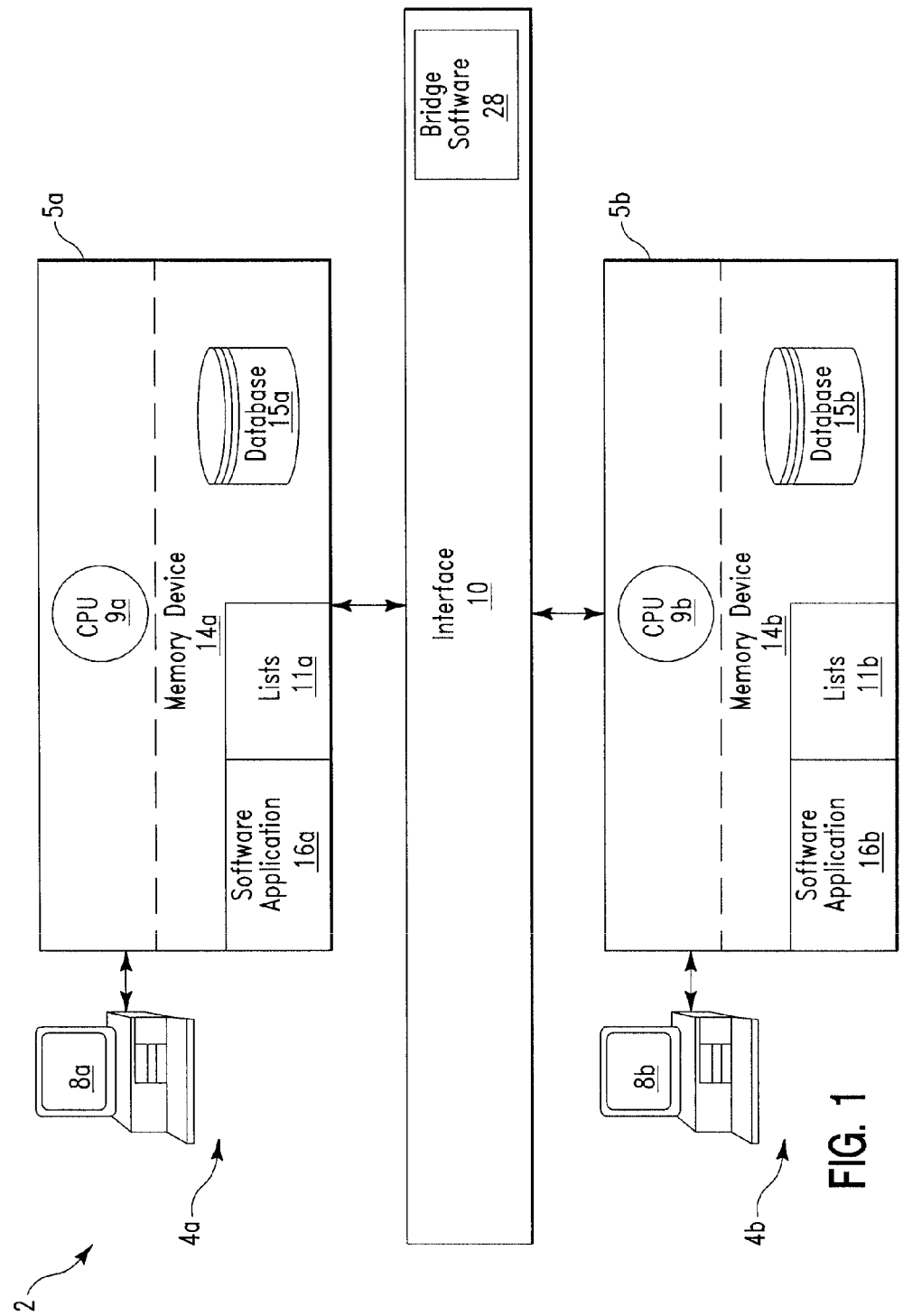
FIG. 1 illustrates a block diagram of a system for transferring computer file attachments between multiple computing systems, in accordance with embodiments of the present invention.

FIG. 1 illustrates a block diagram of a system 2 for transferring computer file attachments between computing systems 4a and 4b, in accordance with embodiments of the present invention. System 2 in the description of FIG. 1 may be used in any business environment for transferring and processing computer file attachments. A computer file attachment is defined herein as any computer file which may be associated with a specific request/response and is electronically attached to that request/response. System 2 controls a transfer process for transferring computer file attachments between computing systems 4a and 4b while performing the following three functions:

1. Prevention of computer viruses—This process involves determining computer file types (i.e., for computer file attachments) that are at low risk of contracting or comprising computer viruses (e.g., .doc, .pdf, .lwp, .123, .xls, .ppt, zip, .html, .htm, .txt, text .csv, and .rtf, etc) and generating a configurable (i.e., allowing for user modification) list 11a and/or 11b of acceptable (i.e., low risk of contracting or comprising computer viruses) computer file types. The configurable list 11a and/or 11b is stored in computing system 4a and/or 4b respectively. Each time a computer file attachment is uploaded to computing system 4a or 4b, a file type for the attachment is compared to the configurable list to determine a match. If the attachment comprises a file type on the configurable list 11a and/or 11b, the attachment is stored in computing system 4a or 4b. If the attachment comprises a file type that is not on the configurable list 11a and/or 11b, the attachment is not stored in computing system 4a or 4b and an error message is transmitted to the user attempting to upload the attachment.

2. Generation of file links—Computing system 4a or 4b generates a file link to a previously loaded computer file attachment (i.e., stored in database 15a or 15b) and places the file link on a display apparatus (e.g., on terminal 8a or 8b). The file link is placed in a position that is adjacent to a file input field used to specify computer file attachments for retrieval.

3. Control of computer file attachments that are shared across multiple computer software applications—Software application 16a and software application 16b are two separate software applications running on different computing systems 4a and 4b using different databases 15a and 15b. While the architecture for the two software applications 16a and 16b and databases 15a and 15b are shared, there are different users for each software application 16a and 16b. Therefore, software application 16a comprises a first software application type for running on computing apparatus 5a and software application 16b comprises a second (different) software application type for running on computing apparatus 5b. System 2 allows a computer file attachment to be uploaded to a first software application (e.g., software application 16a) and makes it downloadable and hence viewable to a second software application (e.g., software application 16b).

System 2 comprises a computing system 4a (e.g., a server) connected to a computing system 4b (e.g., a server) through a through an interface 10. Interface 10 may comprise any type of interface known to a person of ordinary skill in the art including, inter alia, a local area network, (LAN), a wide area network (WAN), the Internet, etc. The interface 10 comprises a bridge software application 28 for linking and automatically controlling data flow (e.g., computer file attachments) between computing system 4a and computing system 4b. Computing system 4a comprises a computing apparatus 5a and an interface terminal 8a. Computing system 4b comprises a computing apparatus 5b and an interface terminal 8b. Computing apparatus 5a comprises a CPU 8a and a memory device 14a. Memory device 14a comprises a database 15a (i.e., for storing computer file attachments) and a software application 16a. Alternatively, database 15a may be located external to computing apparatus 5a. Computing apparatus 5b comprises a CPU 8b and a memory device 14b. Memory device 14b comprises a database 15b (i.e., for storing computer file attachments) and a software application 16b. Alternatively, database 15b may be located external to computing apparatus 5b. Interface terminal 8a enables a first user to interface with computing apparatus 5a. The first user may use interface terminal 8a to upload (i.e., a process (initiated via a Web Browser) of electronically transferring a file from a client's workstation (e.g., terminal 8a) to a computing apparatus (e.g., computing apparatus 5a.)) computer file attachments to computing apparatus 5a for storage in database 15a (i.e., if the computer file attachments comprise a file type on list 11a and/or 11b of acceptable file types as described, supra). Copies of the uploaded computer file attachments in database 15a may be automatically retrieved and transferred by bridge software application 28 to database 15b. Alternatively, the first user may use interface terminal 8a to download (i.e., a process (initiated via a Web Browser) of electronically transferring a file from a computing apparatus (e.g., computing apparatus 5a) to a client's workstation (e.g., terminal 8a)) copies of computer file attachments from database 15a (i.e., that have been retrieved and transferred by bridge software application 28 from database 15b). Likewise, interface terminal 8b enables a second user to interface with computing apparatus 5b. The second user may use interface terminal 8b to upload computer file attachments to computing apparatus 5b for storage in database 15b. Copies of the uploaded computer file attachments in database 15b may be retrieved and transferred by bridge software application 28 to database 15a. Alternatively, the second user may use interface terminal 8b to download copies of computer file attachments from database 15b (i.e., that have been retrieved and transferred by bridge software application 28 from database 15a).

System 2 may be used in any business process including, inter alia, allowing a user (e.g., a requester using terminal 8a) to locate candidates (e.g., contractors, job applicants, etc) for job openings. A requester is defined herein as a person looking for a resource (i.e., a person with a specific skill(s)) to fill an open job position. A requester interacts with a software application (e.g., software application 8a) to identify the skills required, a location and duration of a job assignment, as well as other important characteristics related to a job opening. A supplier is defined herein as a person at an external company (e.g., an employment agency) capable of satisfying resource requests. A supplier interacts with a software application (e.g., software application 8b) to identify candidates with the skills identified by the requester. Requests (e.g. the collection of computer information regarding a job opening and possibly including a file attachment) are electronically posted (i.e., sent) to a supplier (e.g., an employment agency through computing apparatus 5b). The supplier will respond (i.e. send a collection of computer information regarding a job candidate and possibly including a file attachment) with qualified candidates. Computer file attachments in the aforementioned business process may include, inter alia:

1. Resource requirements—A description of what types of job related skills are needed for a job position.

2. Statement of work—A description of work to be performed by a hired candidate.

3. Resume—A description of candidate qualifications and work history.

The following steps illustrate a process (i.e., using system 2) for transferring a file attachment from a requester to a supplier:

1. A requester initiates a computer file attachment upload (e.g., a request for candidates) from terminal 8a to computing apparatus 5a.

2. The computer file arrives at computing apparatus 5a.

3. The file type is audited (i.e., compared to a list of valid file types).

4. If the file type is determined to be valid, the computer file attachment is stored in database 15a.

5. Bridge software 28 periodically "wakes up" and checks for any "new" attachments in database 15a. Bridge software 28 transmits a copy of computer file attachment to database 15b.

6. The file attachment created by the requester on computing apparatus 5a is now available to a supplier on computing apparatus 5b.

7. The supplier initiates a computer file attachment download from computing apparatus 5b to terminal 8b enabling the supplier to view or save the computer file attachment on terminal 8b (i.e., a local PC).

The following steps illustrate a process (i.e., using system 2) for transferring a file attachment from a supplier to a requester:

1. A supplier initiates a computer file attachment (e.g., a resume for candidates) upload from terminal 8*b* to computing apparatus 5*b*.
2. The computer file arrives at computing apparatus 5*b*.
3. The file type is audited (i.e., compared to a list of valid file types).
4. If the file type is determined to be valid, the computer file attachment is stored in database 15*b*.
5. Bridge software 28 periodically "wakes up" and checks for any "new" attachments in database 15*b*. Bridge software 28 transmits a copy of computer file attachment to database 15*a*.
6. The file attachment created by the supplier on computing apparatus 5*b* is now available to a requester on computing apparatus 5*a*.
7. The requester initiates a computer file attachment download from computing apparatus 5*a* to terminal 8*a* enabling the requester to view or save the computer file attachment on terminal 8*a* (i.e., a local PC).

An example of implementation for using system 2 for transferring and processing computer file attachments between computing systems 4*a* and 4*b* is described as follows: A requester logs onto computing system 5*a* (i.e., using terminal 8*a*) and requests a contractor (i.e., candidate) for a Java programmer (i.e., job title) for an upcoming project. The requester searches through terminal 8*a* for a previously generated document file which may contain relevant information describing the current project or perhaps qualification criteria associated with a Java programmer. The requester enables a browse function in order to locate and retrieve the document file from terminal 8*a*. When the requester attempts to upload the retrieved document file to computing system 5*a*, computing system 5*a* enables a virus prevention validation on the document file (i.e., computing system 5*a* compares a file type for the document file to a list of acceptable file types). In response, the requester receives an error message back from a Web browser (i.e., located on computing system 5*a*) stating that the file type for the document file is invalid (i.e., not of the list) and not accepted by for uploading by computing system 5*a*. The requester realizes that he/she has attempted to retrieve and upload the wrong document file. The requester enables the browse function again in order to locate and retrieve the correct document file from terminal 8*a*. When the requester attempts to upload the retrieved document file to computing system 5*a*, computing system 5*a* again enables the virus prevention validation on the document file (i.e., computing system 5*a* compares a file type for the document file to a list of acceptable file types). This time, the document file is accepted and stored in database 15*a*. The requester decides to complete and submit the request at a later time later so he/she saves the request. At a later time the requester, decides to complete his/her request by logging on back to computing system 5*a*. The requester opens the saved request and computing system 5*a* retrieves the previously loaded document file name from database 15*a* and places the file name right over the browser's file input field. This enables the requester to see the file name which he/she previously uploaded and clicking on the file name link allows them to open/save the file. Upon the submission, the computing system 5*a* notifies a bridge software 28 which automatically transfers a copy of the document file across a firewall (i.e., within interface 10) to computing system 5*b* (i.e., stored in database 15*b*) for suppliers to respond with qualified candidates. In response to the transfer, a supplier(s) (i.e., using terminal 8*b*) are automatically notified by to computing system 5*b* about the requester's request. The Supplier downloads the document file from computing system 5*b* to terminal 8*b* in order to conduct reviews. After reviewing the candidate request, the supplier(s) uploads all possible candidates' resumes and computing system 5*b* conducts a virus prevention validation on the resumes (i.e., as described, supra, with reference to computing system 5*a*). The resume files are validated and stored in database 15*b*. The supplier(s) enabled the response(s) and the resume files are bridged over across the firewall (i.e., through interface 10) to computing system 5*a* for the requester to review. The requester is notified with the arrival of the resume files. When the requester logs onto computing system 5*a*, the resume files are downloaded to terminal 8*a* for review of each candidate. Based on the resumes, the requester selects certain candidates for interview. After the interviews are completed, the requester decides to hire one of the candidates by finalizing the request.

Figure 2:
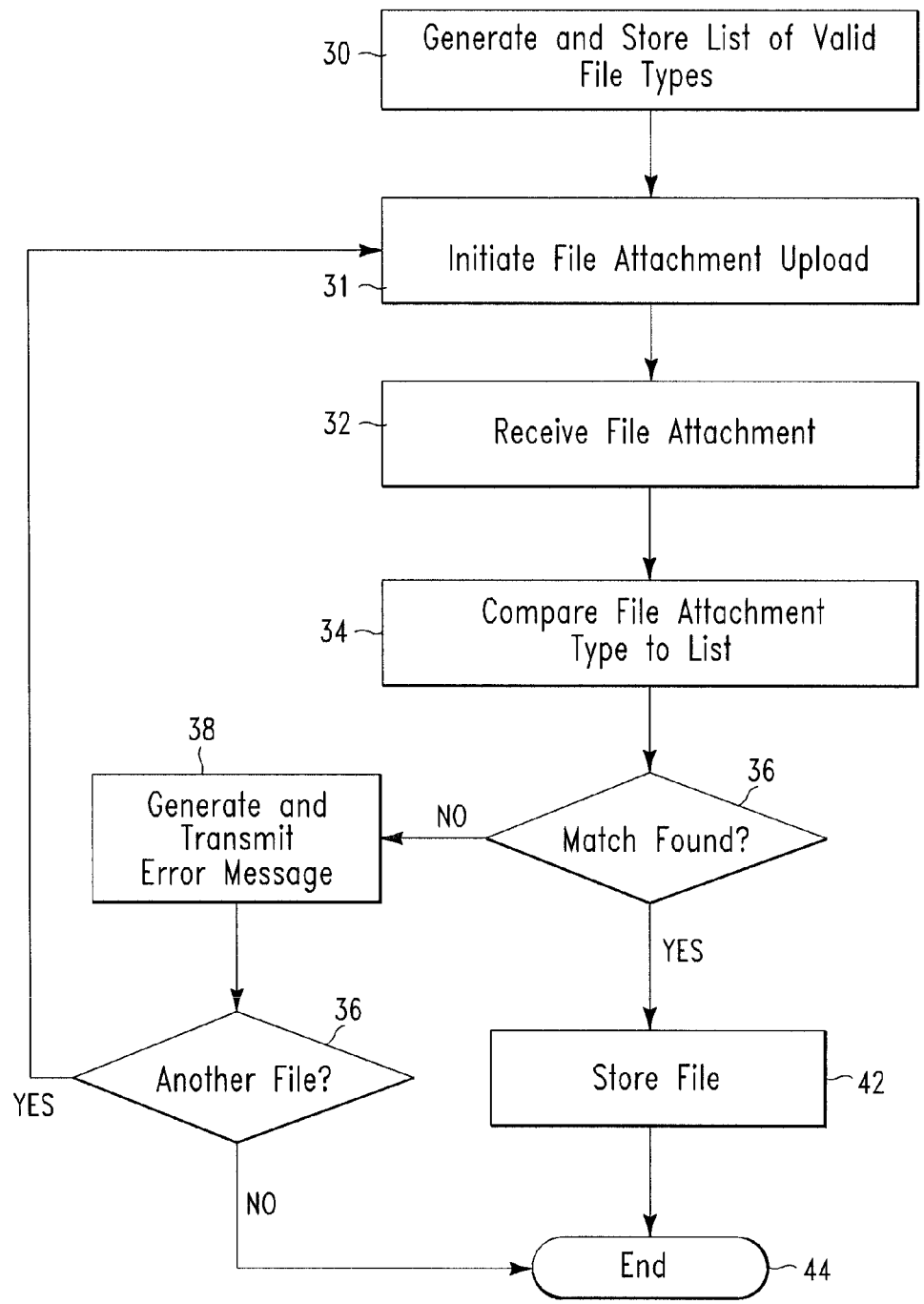
FIG. 2 illustrates a flowchart describing an algorithm used by the system of FIG. 1 for prevention of contracting computer viruses, in accordance with embodiments of the present invention.

FIG. 2 illustrates a flowchart describing an algorithm used by system 2 of FIG. 1 for prevention of contracting computer viruses, in accordance with embodiments of the present invention. In step 30, computer file types (i.e., for computer file attachments) that are at low risk of contracting computer viruses (e.g., .doc, .pdf, .lwp, .123, .xls, .ppt, zip, .html, .htm, .txt, text .csv, and .rtf, etc) are determined and a configurable list of acceptable (i.e., low risk) computer file types is generated. The configurable list is stored in computing system 4*a* and/or 4*b*. In step 31, a user (e.g., a requester) initiates a file attachment upload from terminal 8*a* to computing apparatus 5*a*. Alternatively (in step 31), a user (e.g., a supplier) may initiate a file attachment upload from terminal 8*b* to computing apparatus 5*b*. In step 32, computing apparatus 5*a* or 5*b* receives the uploaded file attachment. In step 34, a file extension (i.e. the file type) is compared to the configurable list of acceptable file types generated in step 30. In step 36, it is determined if a match is found (i.e., the file extension is on the configurable list).

If in step 36, it is determined if that a match is found (i.e., the file extension is on the configurable list) then in step 42 the uploaded file attachment is stored in database 15*a* or 15*b* and the process terminates in step 44.

If in step 36, it is determined if that a match is not found (i.e., the file extension is not on the configurable list) then in step 38 an error message is generated and transmitted to the user. In step 40, the user is given a choice to upload another computer file attachment. If In step 40, the user chooses to upload another computer file attachment then step 31 is repeated. If In step 40, the user does not choose to upload another computer file attachment then the process terminates in step 44.

Figure 3:
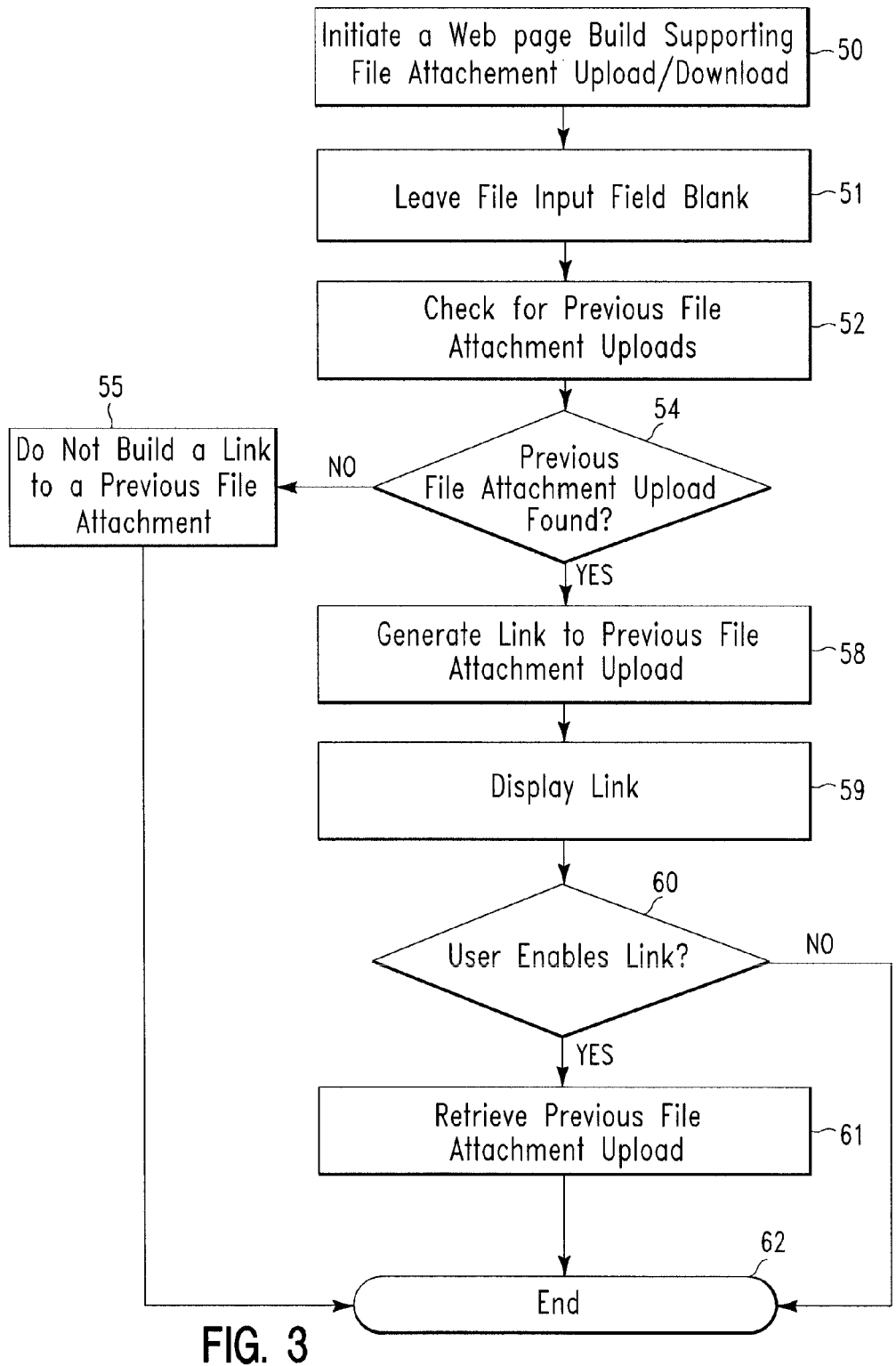
FIG. 3 illustrates a flowchart describing an algorithm used by the system of FIG. 1 for generating and displaying a file link to a previously loaded computer file attachment, in accordance with embodiments of the present invention.

FIG. 3 illustrates a flowchart describing an algorithm used by system 2 of FIG. 1 for generating and displaying a file link to a previously loaded computer file attachment, in accordance with embodiments of the present invention. In step 50, a user (e.g., a requester, a supplier, etc) initiates a Web page build supporting a file attachment upload/download from a terminal to a computing apparatus (e.g., from a terminal 8*a* to computing apparatus 5*a*, from terminal 8*b* to a computing apparatus 5*b*). In step 51, a file input field is left blank. In step 52, the computing apparatus checks in an associated database (e.g., in database 15*a* or 15*b*) for any previously uploaded computer file attachments. In step 54, it is determined if any previously uploaded computer file attachments were found in step 52.

If in step 54, it is determined that a previously uploaded computer file attachment was not found then in step 55, a link is not built to a previous file attachment and the process terminates in step 62.

If in step 54, it is determined that a previously uploaded computer file attachment was found then in step 58, a link to the previously uploaded file attachment is generated. In step

59, the link is displayed for the user. In step 60, it is determined if the user enables the link.

If in step 60, it is determined that the user does not enable the link then the process terminates in step 62.

If in step 60, it is determined that the user does enable the link then in step 61, the user retrieves the previously uploaded file attachment and the process terminates in step 62.

Figure 4:
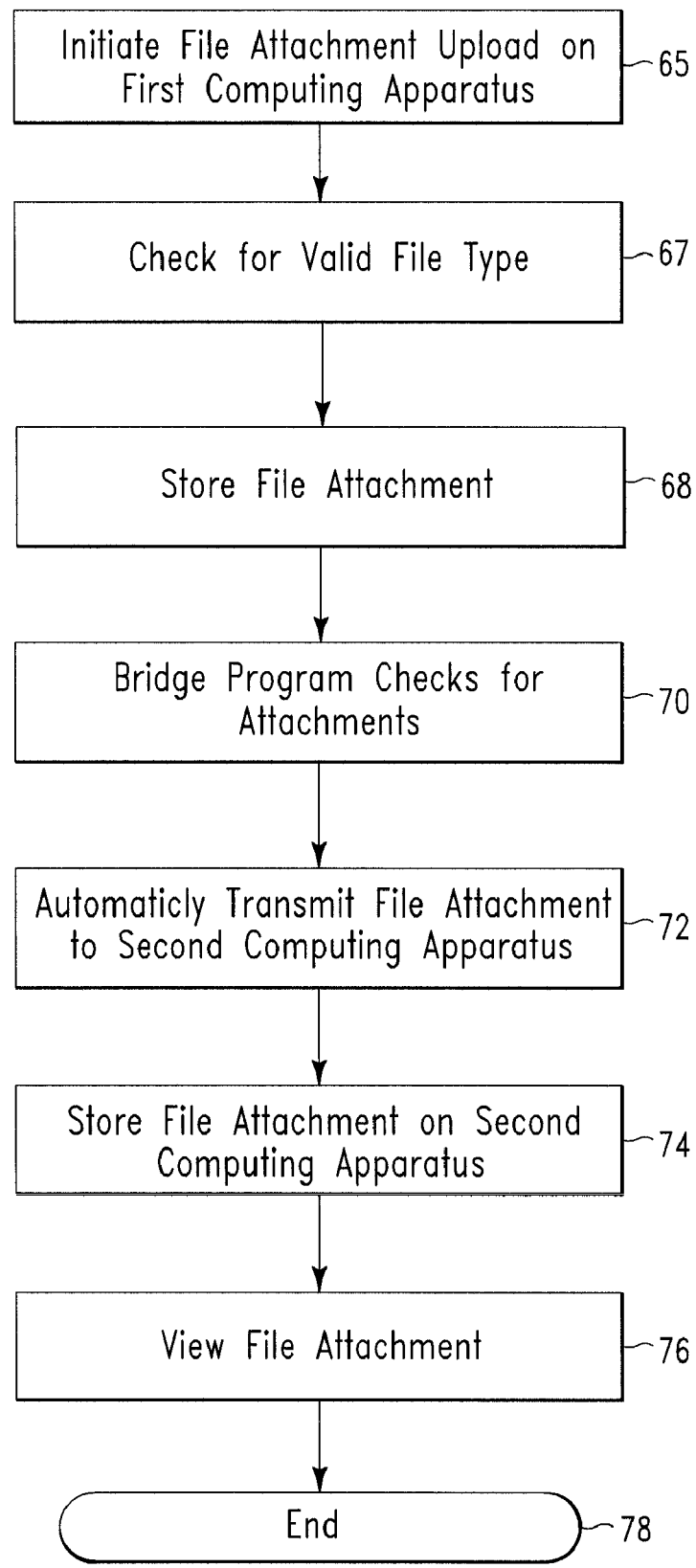
FIG. 4 illustrates a flowchart describing an algorithm used by the system of FIG. 1 for control of computer file attachments that are shared across multiple computer software applications, in accordance with embodiments of the present invention.

FIG. 4 illustrates a flowchart describing an algorithm used by system 2 of FIG. 1 for control of computer file attachments that are shared across multiple computer software applications, in accordance with embodiments of the present invention. In step 65, a user (e.g., a requester, a supplier, etc) initiates a file attachment upload from a first terminal to a first computing apparatus (e.g., from a terminal 8*a* to computing apparatus 5*a*, from terminal 8*b* to a computing apparatus 5*b*). In step 67, the computer file attachment file type is compared to a list of valid file types and the computer file attachment file type is found to be valid (i.e., as described, supra, in steps 34 and 36 of FIG. 2). In step 68, the computer file attachment is stored in a first database. In step 70, bridge software 28 checks the database for attachments. In step 72, bridge software 28 automatically retrieves a copy of the computer file attachment and transmits the copy to a second computing apparatus. In step 74, the computer file attachment is stored in a second database associated with the second computing apparatus. In step 76, the user downloads and views the computer file attachment. In step 78, the process terminates.

Figure 5:
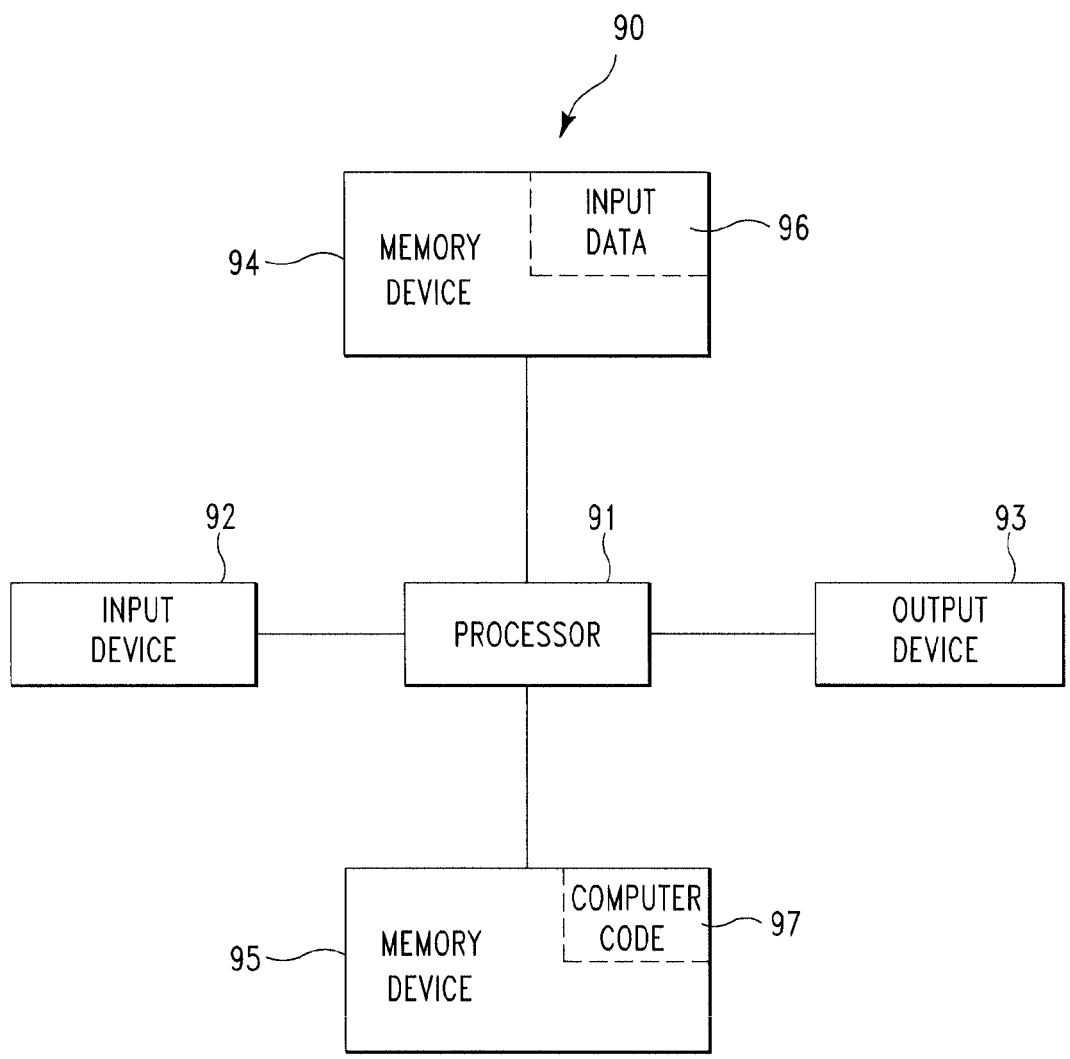
FIG. 5 illustrates a computer apparatus used for processing and transferring computer file attachments between computing systems, in accordance with embodiments of the present invention.

FIG. 5 illustrates a computer apparatus 90 (i.e., computing apparatus 5*a* and/or 5*b* in FIG. 1) used for processing and transferring computer file attachments between computing systems, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., algorithms of FIGS. 2-4) for processing and transferring computer file attachments between computing systems. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise the algorithms of FIGS. 2-4 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to process and transfer computer file attachments between computing systems Thus the present invention discloses a process for deploying or integrating computing infrastructure, comprising integrating computer-readable code into the computer system 90, wherein the code in combination with the computer system 90 is capable of performing a method for processing and transferring computer file attachments between computing systems. In another embodiment, the invention provides a business method that performs the process steps of the invention on a subscription, advertising, and/or fee basis. That is, a service provider, such as a Solution Integrator, could offer to process and transfer computer file attachments between computing systems. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:

generating, by a first computing system, a user configurable list comprising valid computer file types for computer files, said valid computer file types for said computer files comprising a low risk for comprising computer viruses, said user configurable list comprising file extensions associated with each of said valid computer file types, said first computing system comprising a memory device;

storing, by said first computing system, said user configurable list in said memory device;

receiving, from a first user by said first computing system from a second computing system via an automatic bridge software application within an interface between said first computing system and said second computing system, a computer file comprising a first file type, wherein said computer file comprises: resource requirements including descriptions associated with types of job related skills necessary for a specified job position, a duration and location for said specified job position, a description of work to be performed by a hired candidate, and a description of candidate qualifications and work history;

comparing, by a computer processor of said first computing system, said first file type with said file extensions of said user configurable list to determine if said first file type comprises a valid file type of said user configurable list;

determining, by said first computing system, that an additional computer file has been previously uploaded to said first computing system;

comparing, by said computer processor, a file type of said additional computer file with said file extensions of said user configurable list to determine that said file type comprises a valid file type of said user configurable list;

generating, by said first computing system, a first Web browser based file input field for retrieving computer files from said first computing system, said first Web browser based file input field blank;

generating, by said first computing system, a first Web browser based file link for automatically retrieving said additional computer file;

displaying, by said first computing system, said first Web browser based file input field and said first Web browser based file link, said first Web browser based file input field located adjacent to said first Web browser based file link on first computing system;

placing, by said first computing system in response to a command from said first user, said first Web browser based file link within said first Web browser based file input field; and retrieving, by said first computing system in response to said placing, said additional computer file;

converting, by said first computing system, a copy of said additional computer file to a format differing from a current format of said additional file, said format allowing said additional computer file to be downloadable and viewable by said second computing system; and transmitting, by said first computing system to said automatic bridge software application, a command to automatically transmit said copy of said additional computer file across an internal firewall and to said second computing system.

2. The method of claim 1, wherein said receiving said computer file is performed using a Web browser.

3. The method of claim 1, wherein said comparing determines that said first file type does not comprise said valid file type, and wherein said method further comprises;

generating, by said first computing system, an error message indicating that said first file type does not comprise said valid file type; and transmitting, by said first computing system, said error message to said first user of said first computing system.

4. The method of claim 1, wherein said comparing determines that said first file type does comprise said valid file type, and wherein said method further comprises;

storing, within said memory device, said computer file.

5. The method of claim 4, further comprising:

transmitting, by said first computing system, a copy of said computer file to said second computing system, wherein said first computing system comprises a first software application comprising a first software application type, wherein said second computing system comprises a second software application comprising a second software application type, and wherein said first software application type differs from said second software application type.

6. The method of claim 5, further comprising:

receiving, by said first computing system, instructions for updating said computer file with new information;

generating in response to said instructions, by said first computing system, an updated computer file from said computer file, said updated computer file comprising said new information; and automatically transmitting, by said first computing system, a copy of said updated computer file to said second computing system.

7. The method of claim 5, wherein said first software application and said second software application support a business process for a business.

8. The method of claim 4, wherein said first computing system comprises a display apparatus, and wherein said method further comprises:

generating, by said first computing system, a Web browser based file input field for retrieving additional computer files from said first computing system;

generating, by said first computing system, a Web browser based file link for automatically retrieving said computer file from said memory device; and displaying, on said display apparatus, said Web browser based file input field and said Web browser based file link, said Web browser based file input field located adjacent to said Web browser based file link on said display apparatus, said automatically retrieving activated by enabling said Web browser based file link.

9. The method of claim 8, wherein said first computing system further comprises an input device, and wherein said input device is used for said enabling said Web browser based file link.

10. The method of claim 1, wherein said valid computer file types are selected from the group of file types consisting of .doc, .pdf, .lwp, .123, .xls, .ppt, .zip, .html, .htm, .txt, .text .csv, and .rtf.

11. A computing system comprising a computer processor; and a computer-readable memory unit, said memory unit comprising instructions that when executed by the computer processor implement a file attachment processing method, said method comprising:

generating, by said computing system, a user configurable list comprising valid computer file types for computer files, said valid computer file types for said computer files comprising a low risk for comprising computer viruses, said user configurable list comprising file extensions associated with each of said valid computer file types;

storing, by said computing system, said user configurable list in said memory unit;

receiving, from a first user by said computing system, from a second computing system via an automatic bridge software application within an interface between said first computing system and said second computing system, a computer file comprising a first file type, wherein said computer file comprises: resource requirements including descriptions associated with types of job related skills necessary for a specified job position, a duration and location for said specified job position, a description of work to be performed by a hired candidate, and a description of candidate qualifications and work history;

comparing, by said computer processor of said computing system, said first file type with said file extensions of said user configurable list to determine if said first file type comprises a valid file type of said user configurable list;

determining, by said computing system, that an additional computer file has been previously uploaded to said computing system;

comparing, by said computer processor, a file type of said additional computer file with said file extensions of said user configurable list to determine that said file type comprises a valid file type of said user configurable list;

generating, by said computing system, a first Web browser based file input field for retrieving computer files from said computing system, said first Web browser based file input field blank;

generating, by said computing system, a first Web browser based file link for automatically retrieving said additional computer file;

displaying, by said computing system, said first Web browser based file input field and said first Web browser based file link, said first Web browser based file input field located adjacent to said first Web browser based file link on computing system;

placing, by said computing system in response to a command from said first user, said first Web browser based file link within said first Web browser based file input field; and retrieving, by said computing system in response to said placing, said additional computer file;

converting, by said computing system, a copy of said additional computer file to a format differing from a current format of said additional file, said format allowing said additional computer file to be downloadable and viewable by said second computing system; and transmitting, by said computing system to said automatic bridge software application, a command to automatically transmit said copy of said additional computer file across an internal firewall and to said second computing system.

12. The computing system of claim 11, wherein said receiving said computer file is performed using a Web browser.

13. The computing system of claim 11, wherein said comparing determines that said first file type does not comprise said valid file type, and wherein said method further comprises;
   generating, by said computing system, an error message indicating that said first file type does not comprise said valid file type; and
   transmitting, by said computing system, said error message to said first user of said computing system.

14. The computing system of claim 11, wherein said comparing determines that said first file type does comprise said valid file type, and wherein said method further comprises;
   storing, within said memory unit, said computer file.

15. The computing system of claim 14, wherein said method further comprises:
   transmitting, by said computing system, a copy of said computer file to a computing apparatus, wherein said computing system comprises a first software application comprising a first software application type, wherein said computing apparatus comprises a second software application comprising a second software application type, and wherein said first software application type differs from said second software application type.

16. The computing system of claim 15, wherein said method further comprises:
   receiving, by said computing system, instructions for updating said computer file with new information;
   generating in response to said instructions, by said computing system, an updated computer file from said computer file, said updated computer file comprising said new information; and
   automatically transmitting, by said computing system, a copy of said updated computer file to said computing apparatus.

17. The computing system of claim 15, wherein said first software application and said second software application support a business process for a business.

18. The computing system of claim 14, wherein said computing system comprises a display apparatus, and wherein said method further comprises:

generating, by said computing system, a Web browser based file input field for retrieving additional computer files from said computing system;

generating, by said computing system, a Web browser based file link for automatically retrieving said computer file from said memory device; and displaying, on said display apparatus, said Web browser based file input field and said Web browser based file link, said Web browser based file input field located adjacent to said Web browser based file link on said display apparatus, said automatically retrieving activated by enabling said Web browser based file link.

19. The computing system of claim 18, wherein said first computing system further comprises an input device, and wherein said input device is used for said enabling said Web browser based file link.

20. The computing system of claim 11, wherein said valid computer file types are selected from the group of file types consisting of .doc, .pdf, .lwp, .123, .xls, .ppt, .zip, .html, .htm, .txt, .text .csv, and .rtf.

21. A computer program product, comprising a computer readable storage device comprising a computer readable program code embodied therein, said computer readable program code implementing a file attachment processing method within a first computing system, said method comprising:
   generating, by said first computing system, a user configurable list comprising valid computer file types for computer files, said valid computer file types for said computer files comprising a low risk for comprising computer viruses, said user configurable list comprising file extensions associated with each of said valid computer file types, said first computing system comprising a memory device;
   storing, by said first computing system, said user configurable list in said memory device;
   receiving, from a first user by said first computing system from a second computing system via an automatic bridge software application within an interface between said first computing system and said second computing system, a computer file comprising a first file type, wherein said computer file comprises: resource requirements including descriptions associated with types of job related skills necessary for a specified job position, a duration and location for said specified job position, a description of work to be performed by a hired candidate, and a description of candidate qualifications and work history;
   comparing, by a computer processor of said first computing system, said first file type with said file extensions of said user configurable list to determine if said first file type comprises a valid file type of said user configurable list;
   determining, by said first computing system, that an additional computer file has been previously uploaded to said first computing system;
   comparing, by said computer processor, a file type of said additional computer file with said file extensions of said user configurable list to determine that said file type comprises a valid file type of said user configurable list;
   generating, by said first computing system, a first Web browser based file input field for retrieving computer files from said first computing system;
   generating, by said first computing system, a first Web browser based file link for automatically retrieving said additional computer file, said first Web browser based file input field blank;

displaying, by said first computing system, said first Web browser based file input field and said first Web browser based file link, said first Web browser based file input field located adjacent to said first Web browser based file link on first computing system;

placing, by said first computing system in response to a command from said first user, said first Web browser based file link within said first Web browser based file input field; and retrieving, by said first computing system in response to said placing, said additional computer file;

converting, by said first computing system, a copy of said additional computer file to a format differing from a current format of said additional file, said format allowing said additional computer file to be downloadable and viewable by said second computing system; and transmitting, by said first computing system to said automatic bridge software application, a command to automatically transmit said copy of said additional computer file across an internal firewall and to said second computing system.

22. The computer program product of claim 21, wherein said receiving said computer file is performed using a Web browser.

23. The computer program product of claim 21, wherein said comparing determines that said first file type does not comprise said valid file type, and wherein said method further comprises;
generating, by said first computing system, an error message indicating that said first file type does not comprise said valid file type; and
transmitting, by said first computing system, said error message to a first user of said first computing system.

24. The computer program product of claim 21, wherein said comparing determines that said first file type does comprise said valid file type, and wherein said method further comprises;
storing, within said memory device, said computer file.

25. The computer program product of claim 24, wherein said method further comprises:
transmitting, by said first computing system, a copy of said computer file to said second computing system, wherein said first computing system comprises a first software application comprising a first software application type, wherein said second computing system comprises a second software application comprising a second software application type, and wherein said first software application type differs from said second software application type.

26. The computer program product of claim 25, wherein said method further comprises:
receiving, by said first computing system, instructions for updating said computer file with new information;
generating in response to said instructions, by said first computing system, an updated computer file from said computer file, said updated computer file comprising said new information; and
automatically transmitting in response to said generating said updated computer file, by said first computing system, a copy of said updated computer file to said second computing system.

27. The computer program product of claim 25, wherein said first software application and said second software application support a business process for a business.

28. The computer program product of claim 24, wherein said first computing system comprises a display apparatus, and wherein said method further comprises:

generating, by said first computing system, a Web browser based file input field for retrieving additional computer files from said first computing system;
generating, by said first computing system, a Web browser based file link for automatically retrieving said computer file from said memory device; and
displaying, on said display apparatus, said Web browser based file input field and said Web browser based file link, said Web browser based file input field located adjacent to said Web browser based file link on said display apparatus, said automatically retrieving activated by enabling said Web browser based file link.

29. The computer program product of claim 28, wherein said first computing system further comprises an input device, and wherein said input device is used for said enabling said Web browser based file link.

30. The computer program product of claim 21, wherein said valid computer file types are selected from the group of file types consisting of .doc, .pdf, .lwp, .123, .xls, .ppt, .zip, .html, .htm, .txt, .text .csv, and .rtf.

31. A process for integrating computing infrastructure, comprising integrating computer-readable code into a first computing system comprising a computer processor, wherein the code in combination with the first computing system performs a file attachment processing method comprising:
generating, by said first computing system, a user configurable list comprising valid computer file types for computer files, said valid computer file types for said computer files comprising a low risk for comprising computer viruses, said user configurable list comprising file extensions associated with each of said valid computer file types, said first computing system comprising a memory device;
storing, by said first computing system, said user configurable list in said memory device;
receiving, from a first user by said first computing system from a second computing system via an automatic bridge software application within an interface between said first computing system and said second computing system, a computer file comprising a first file type, wherein said computer file comprises: resource requirements including descriptions associated with types of job related skills necessary for a specified job position, a duration and location for said specified job position, a description of work to be performed by a hired candidate, and a description of candidate qualifications and work history;
comparing, by said computer processor of said first computing system, said first file type with said file extensions of said user configurable list to determine if said first file type comprises a valid file type of said user configurable list;
determining, by said first computing system, that an additional computer file has been previously uploaded to said first computing system;
comparing, by said computer processor, a file type of said additional computer file with said file extensions of said user configurable list to determine that said file type comprises a valid file type of said user configurable list;
generating, by said first computing system, a first Web browser based file input field for retrieving computer files from said first computing system, said first Web browser based file input field blank;
generating, by said first computing system, a first Web browser based file link for automatically retrieving said additional computer file;

displaying, by said first computing system, said first Web browser based file input field and said first Web browser based file link, said first Web browser based file input field located adjacent to said first Web browser based file link on first computing system;

placing, by said first computing system in response to a command from said first user, said first Web browser based file link within said first Web browser based file input field; and retrieving, by said first computing system in response to said placing, said additional computer file;

converting, by said first computing system, a copy of said additional computer file to a format differing from a current format of said additional file, said format allowing said additional computer file to be downloadable and viewable by said second computing system; and transmitting, by said first computing system to said automatic bridge software application, a command to automatically transmit said copy of said additional computer file across an internal firewall and to said second computing system.

32. The process of claim 31, wherein said receiving said computer file is performed using a Web browser.

33. The process of claim 31, wherein said comparing determines that said first file type does not comprise said valid file type, and wherein said method further comprises;

generating, by said first computing system, an error message indicating that said first file type does not comprise said valid file type; and transmitting, by said first computing system, said error message to a first user of said first computing system.

34. The process of claim 31, wherein said comparing determines that said first file type does comprise said valid file type, and wherein said method further comprises:

storing, within said memory device, said computer file.

35. The process of claim 34, wherein said method further comprises:

transmitting, by said first computing system, a copy of said computer file to said second computing system, wherein said first computing system comprises a first software application comprising a first software application type, wherein said second computing system comprises a second software application comprising a second software application type, and wherein said first software application type differs from said second software application type.

36. The process of claim 35, wherein said method further comprises:

receiving, by said first computing system, instructions for updating said computer file with new information;

generating in response to said instructions, by said first computing system, an updated computer file from said computer file, said updated computer file comprising said new information; and automatically transmitting, by said first computing system, a copy of said updated computer file to said second computing system.

37. The process of claim 35, wherein said first software application and said second software application support a business process for a business.

38. The process of claim 34, wherein said first computing system comprises a display apparatus, and wherein said method further comprises:

generating, by said first computing system, a Web browser based file input field for retrieving additional computer files from said first computing system;

generating, by said first computing system, a Web browser based file link for automatically retrieving said computer file from said memory device; and displaying, on said display apparatus, said Web browser based file input field and said Web browser based file link, said Web browser based file input field located adjacent to said Web browser based file link on said display apparatus, said automatically retrieving activated by enabling said Web browser based file link.

39. The process of claim 38, wherein said first computing system further comprises an input device, and wherein said input device is used for said enabling said Web browser based file link.

40. The process of claim 31, wherein said valid computer file types are selected from the group of file types consisting of .doc, .pdf, .lwp, .123, .xls, .ppt, .zip, .html, .htm, .txt, .text .csv, and .rtf.

* * * * *